Aug. 25, 1925. 1,550,696

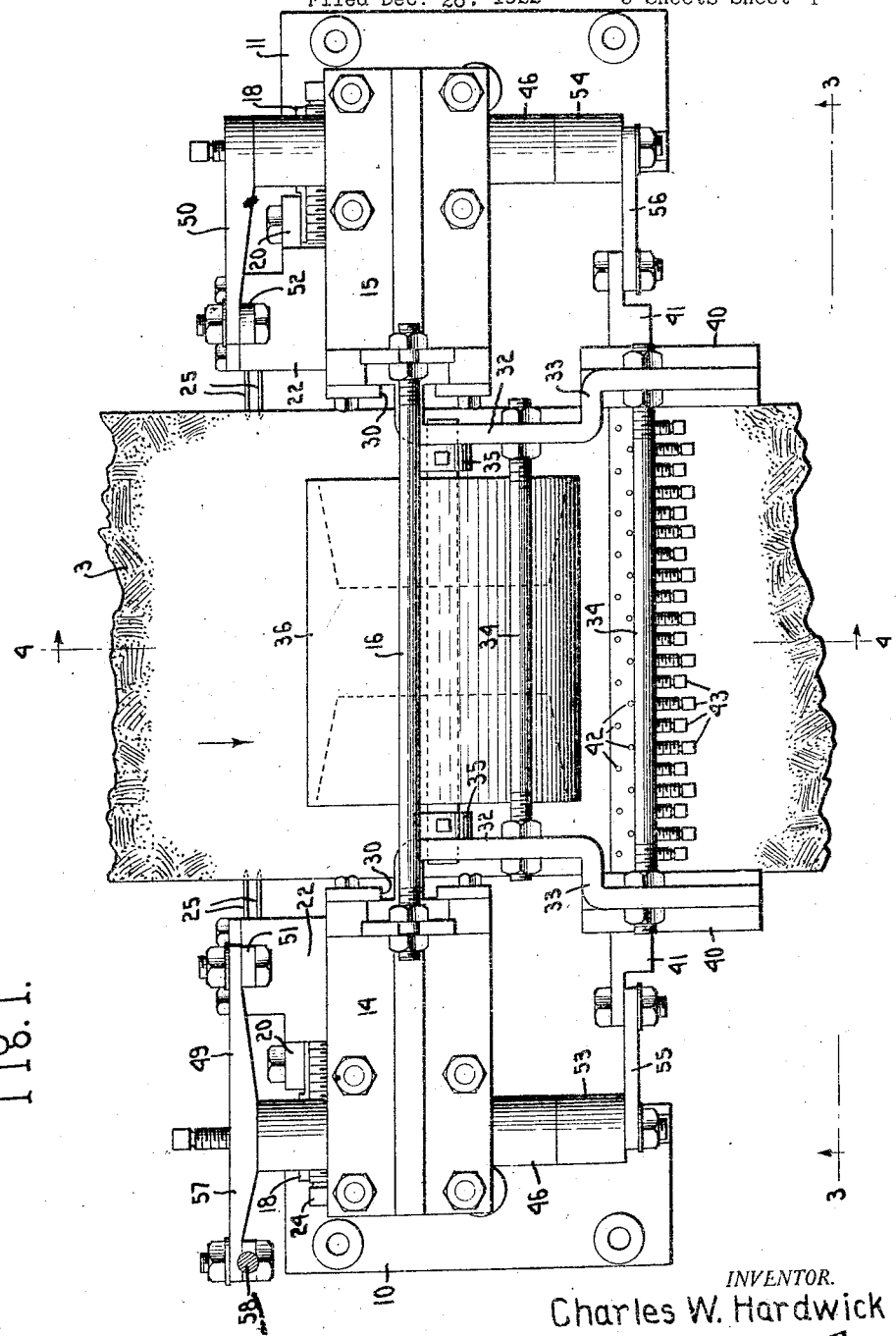

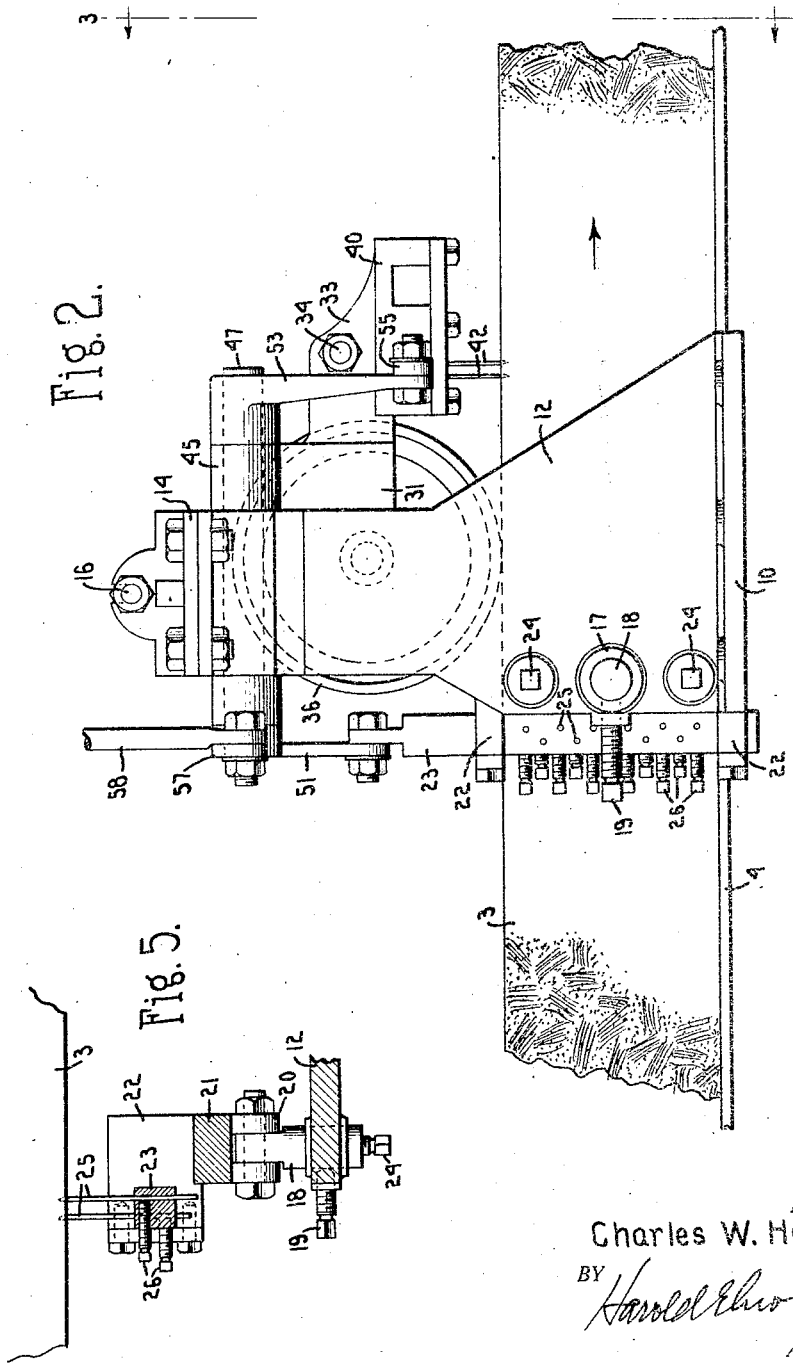

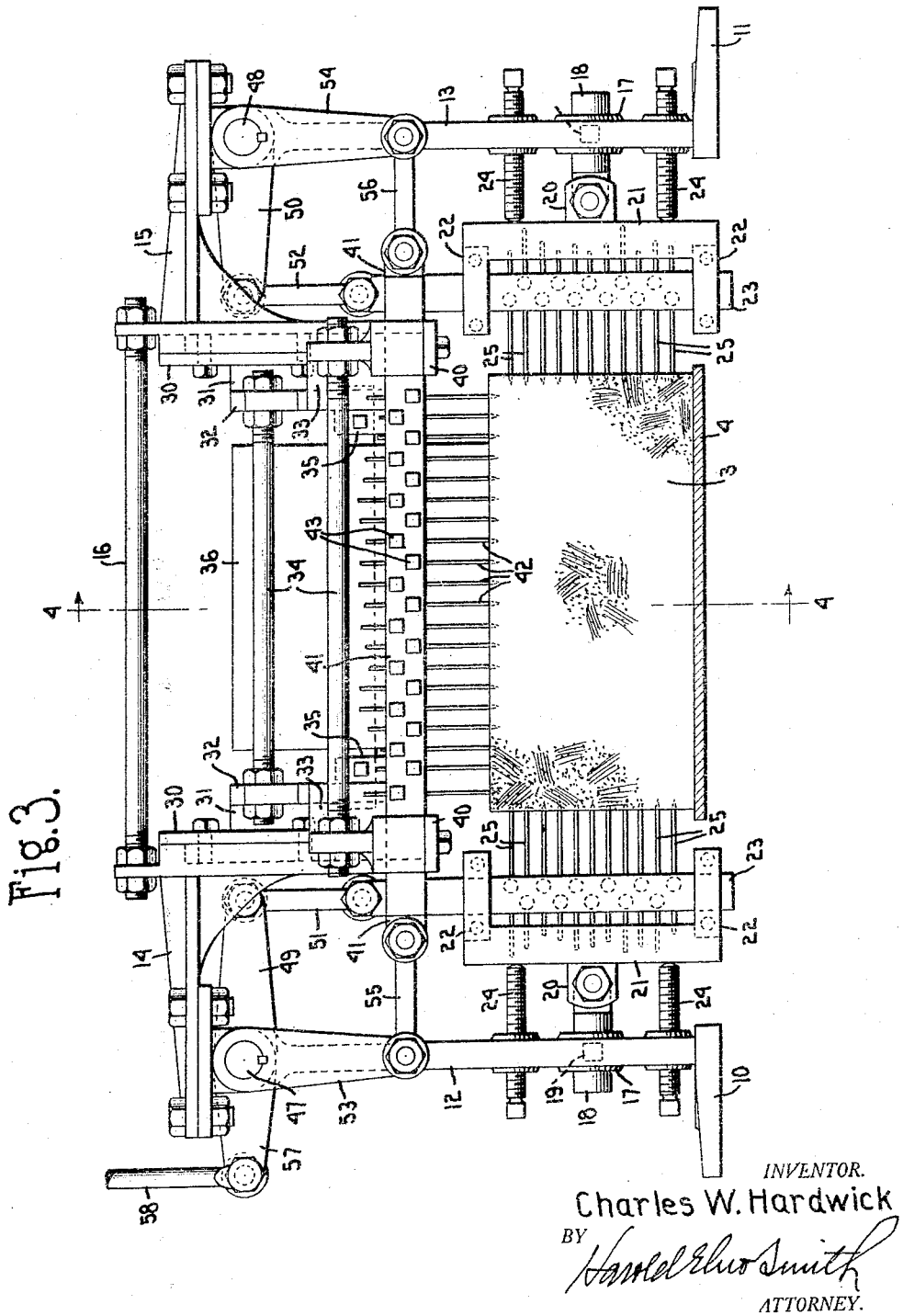

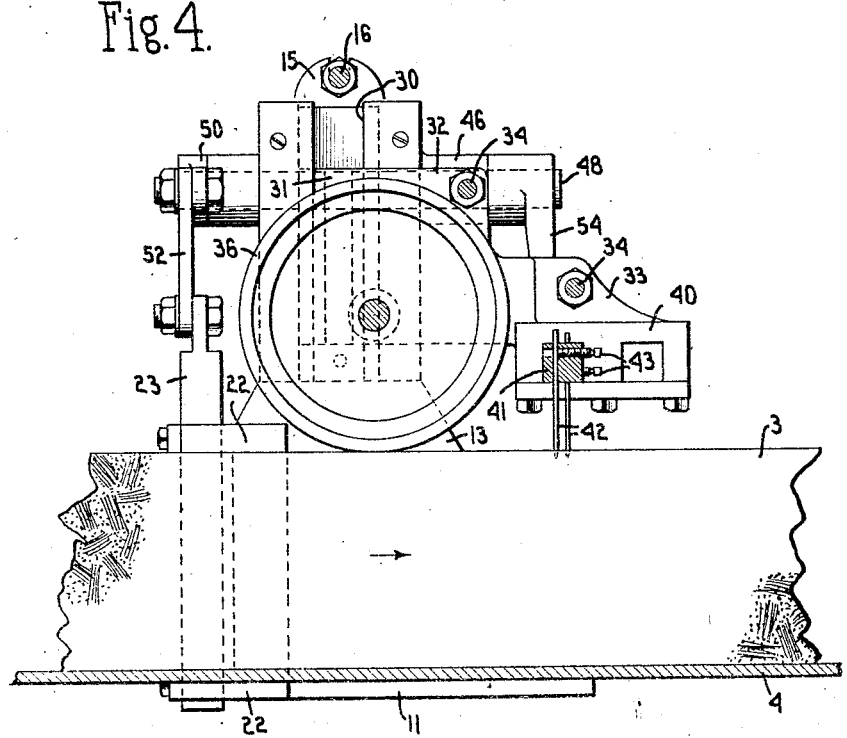
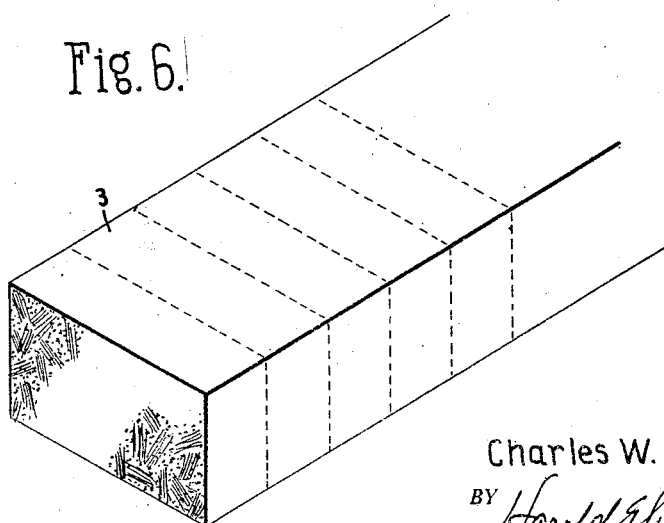

C. W. HARDWICK

BRICKMAKING MACHINERY

Filed Dec. 26, 1922 5 Sheets-Sheet 5

INVENTOR.
Charles W. Hardwick
BY Harold Elmo Smith
ATTORNEY.

Patented Aug. 25, 1925.

1,550,696

UNITED STATES PATENT OFFICE.

CHARLES W. HARDWICK, OF MALVERN, ARKANSAS.

BRICKMAKING MACHINERY.

Application filed December 26, 1922. Serial No. 609,025.

*To all whom it may concern:*

Be it known that I, CHARLES W. HARDWICK, a citizen of the United States, residing at Malvern, in the county of Hot Spring and State of Arkansas, have invented a certain new and useful Improvement in Brickmaking Machinery, of which the following is a full, clear, and exact description, reference being had to the accompanying drawings.

This invention relates to brick making machinery and has for its object the provision of mechanism adapted to roughen and abrade the surface of the brick either for the purpose of facilitating their drying or of causing mortar to adhere more strongly thereto or of improving their appearance. In the manufacture of brick by the stiff mud process, wherein clay is extruded under high pressure through a die of the required size and shape to form a continuous clay bar which is then cut into individual bricks, the smoothing action of the die gives rise to two objectionable effects that an impervious surface layer or skin is formed which retards the escape of moisture and a smooth and monotonous exterior is produced which does not adhere well to mortar and is not attractive to the eye when this surface is the one exposed. As a result the only surface of the brick which adheres well to mortar or which is artistic is the surface produced by the cutter and it is through this surface that practically all the evaporation of moisture occurs. The objects of my invention are the provision of a simple and compact apparatus whereby the surface of this clay may be roughened without impeding in any way the operation of the brick-making machine; the provision of an apparatus of this nature which shall be simple and practical to use in commercial brick plants; the provision of an apparatus of this nature which can readily be adjusted for different sizes of brick or different designs of marking or which can be used on either end cut or side cut bricks; while further objects and advantages of the invention will become apparent as the description proceeds.

Figure 7:
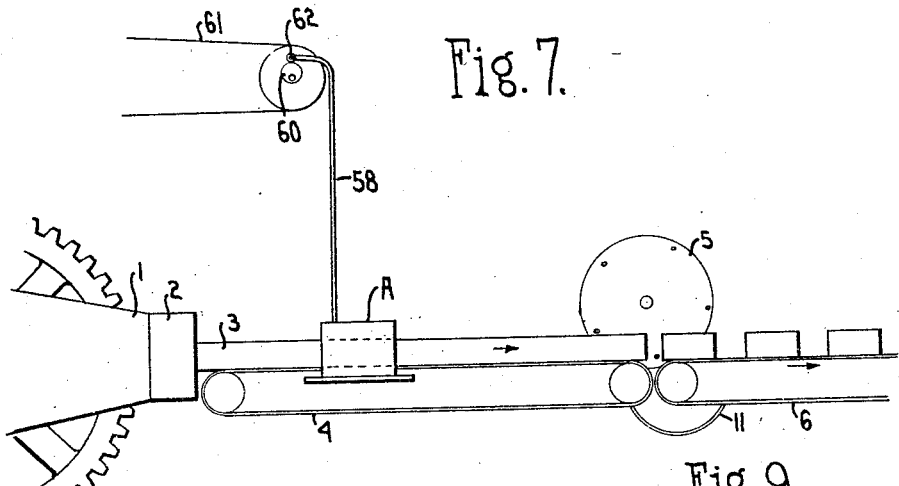
Figure 8:
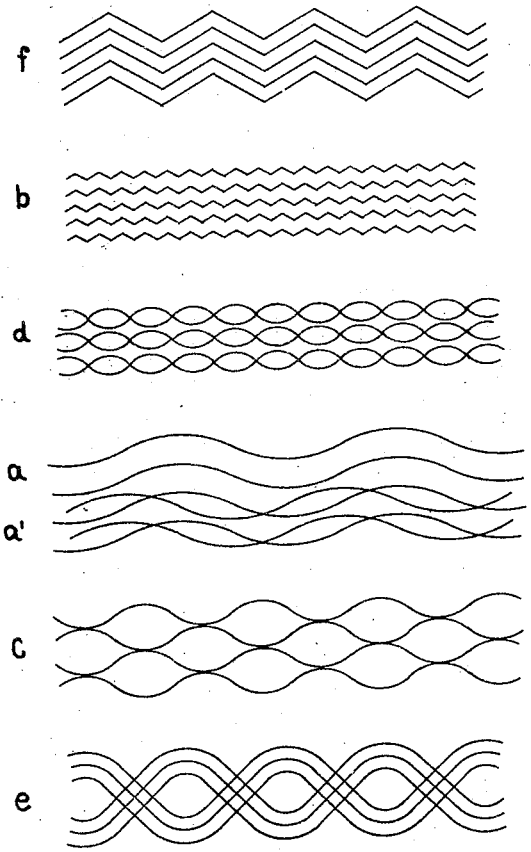
Figure 9:
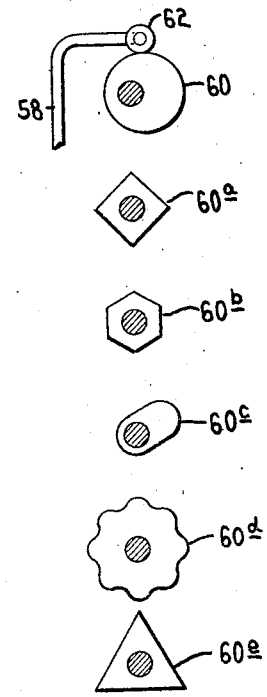

In the drawings accompanying and forming a part of this application I have shown one embodiment of my said invention although it will be understood that these drawings are intended to be merely illustrative of the general principles of my invention and not to restrict me to any particular details shown therein. In these drawings Fig. 1 is a top plan view of my improved apparatus showing its relation to the clay-bar; Fig. 2 is a right-hand side elevation thereof; Fig. 3 is a plan view corresponding to the line 3—3 of Figs. 1 and 2; Fig. 4 is a vertical sectional view corresponding to the line 4—4 of Figs. 1 and 3; Fig. 5 is a detail of one of the supports for the reciprocating rods; Fig. 6 is a perspective view of the clay-bar after having been marked with one of the many patterns possible with this penetrating machine and indicating the mode of cutting therefrom the eventual bricks; Fig. 7 is a diagrammatic view illustrating the general mode of applying my apparatus to a brick machine of the end cut type; Fig. 8 is a series of views showing different designs possible to be obtained by the use of the apparatus herein shown; and Fig. 9 illustrates a series of cams by means of which different designs can be obtained.

Describing the parts by reference characters, attention being first directed to Fig. 7, 1 represents the body of a brick machine, 2 the die through which the clay is extruded, 3 the clay-bar which issues therefrom, and 4 an endless belt upon which this bar is received. 5 represents a cutting device which severs the clay-bar into regular sections, each one of which constitutes a brick, and 6 represents a second endless belt operated at slightly higher speed which receives the bricks the instant they are severed and carries them away to the drying cars. The parts herein mentioned are common in some form to all brick machines of the stiff mud type, although differences exist in respect of the number of streams or bars issuing at one time, the mode of severing the same into bricks, and the relation of the severed brick to the bar itself, whether end-wise or side-wise. According to my invention a suitable marking or scratching device is located adjacent the clay-bar between the die and cutting device so as to inscribe a predetermined design thereon, such a device being indicated generally at A in Fig. 7 and one detail construction thereof being shown in Figs. 1 to 5 hereof.

Rigidly secured upon opposite sides of the belt 4 are the supporting feet 10—11 from which rise the uprights 12 and 13, respectively, to whose upper ends are bolted the head members 14—15, respectively, which are spaced apart and made rigid by the tie-rod 16. Each of the uprights 12—13 is formed with a socket 17 which slidably receives the shank 18 of an eye-bolt held in place by the set-screw 19, the inner end of this bolt being pivoted to an ear 20 carried by the base 21 of a U-shaped member whose arms 22—22 are apertured for the slidable reception of the vertically reciprocable rods 23—23 located one at each side of the machine. Above and below the eye-bolt 18 and parallel therewith are mounted the set-screws 24—24 by means of which the members 21—21 are adjusted into parallelism with the adjacent sides of the clay-bar, while the reciprocable members 23—23 are apertured for a large number of horizontal needles 25 held in place by suitable set screws 26 and adapted to engage such clay-bar as the same moves therepast.

The adjacent faces of the heads 14—15 are formed with vertical parallel guide-ways 30—30 in each of which is a movable slide 31, such slide being formed with horizontal projecting ears 32 and 33 which are connected together by tie rods 34—34 so as to constitute a kind of carriage. Journaled in suitable bearings 35 carried by these slides is a cylindrical roller 36 which runs on the top of the clay-bar and raises and lowers the slide automatically in accordance with the thickness thereof. Carried by each of the ears 32—33 is a bearing member 40 in which is slidably mounted the horizontal reciprocating rod 41 which is thus maintained at a uniform distance and parallel to the clay-bar. This rod 41 is also formed with spaced apertures receiving the needles 42 adapted to engrave the clay bar, and held in place by the set screws 43. In the present embodiment the member 40 is formed with two slots so that two reciprocating rods 41 can be employed if desired, thereby increasing the number of designs possible to be produced; but for purposes of clearness I have shown only one such rod and likewise it will be understood that the bearing members 21—21 may be formed with plural slide-ways for the same purpose.

Carried by the upper ends of the uprights 12—13 are the horizontal bearings 45—46, respectively, in which are journaled the rock-shafts 47 and 48, respectively. Secured to the ends of these shafts are the horizontal arms 49 and 50, respectively, connected by reciprocating links 51, 52 to the adjacent reciprocating rods 23; and secured to the other ends of the shafts 47 and 48 are the depending arms 53 and 54, respectively, connected to opposite ends of the reciprocating rod 41 by the links 55, 56, respectively. One of the shafts 47 or 48 is also provided with an operating arm 57 (here shown as a continuation of one of the arms 49) to which is articulated the operating rod 58. The opposite end of this rod extends into operative relation with the cam, crank, eccentric, rocker, or the like device driven by some suitable source of power as by being connected to some part of the brick machine or some independent source of power. In Figs. 7 and 9 I have shown a cam 60 driven by an independent belt 61 and engaging a suitable roller 62 carried by the rod 58, the advantage of the cam being its simplicity and the fact that the mere substitution of different cams affords a large number of different designs. In this embodiment the down-stroke is caused by the weight of the rod 58 but this is merely a convenient arrangement.

The operation of the machine is as follows: The clay-bar 3 is delivered by the brick machine in substantially uniform size and at a substantially uniform speed, and the operating rod 58 is reciprocated at a speed determined by the revolution and contour of the cam 60. The oscillations of the rock-shaft 47 are communicated to the vertical rod 23 by the link 51 and to the horizontal rod 41 by the link 55. The rod 41 in turn oscillates the rock shaft 48 through the agency of the link 56 and arm 54, which in turn reciprocates the vertical rod 23 by the arm 50 and link 52. The roller 36 causes the rod 41 to rise and fall in accordance with the thickness of the clay-bar, thereby causing the needles 42 to penetrate the same in a uniform manner but without interfering with the reciprocation of this rod or its communicating the movement of the shaft 48. Inasmuch as the two sides of the clay-bar are engraved at the same time there is no tendency to deflect the same from its proper path, but rather to hold the same thereto.

The pattern traced on the clay-bar depends upon the number and arrangement of the needles, the relative speed of the cam 60 and clay-bar 3 and the contour of the cam. Thus with a plain eccentric cam, each needle will generate a sine-curve whose length depends upon the relative speed of the cam and clay-bar, and in case there be but one row of needles in each rod the pattern traced will be that shown at "a" and "b" in Fig. 8. If a second row of needles be employed as illustrated in these drawings, a second similar curve identical with the first but different in phase will be produced with the production of an interlocking design as shown at "$a'$" in Fig. 8. Merely by changing the relative speed of the cam or the amplitude of its movement it is possible to secure the patterns shown at "$c$," "$d$" and "$e$," while by changing its contour it is possible to secure numerous other shapes, one of which is suggested at "$f$." Various different shapes of cam are shown at $60^a$, $60^b$, $60^c$, etc., in Fig. 9, and by a suitable selection of the same and the use of a larger or smaller number of needles either in the same row or in different rows (used even upon different rods as hereinbefore suggested) it is possible to secure an endless number of designs, all however having the same ultimate effect of giving a matte surface to the brick improving its artistic appearance, increasing the adhesion of mortar thereto, and facilitating its drying so as materially to decrease the amount of fuel necessary to make the same. It is desirable, however, that none of the needles shall at any time cross any of the longitudinal edges of the clay-bar lest they tear out the corners and produce a mutilated brick.

It will be understood that I do not limit myself to the details of construction of the apparatus herein shown nor to the specific design and arrangement of its parts, nor to the mode of connecting and driving the different elements thereof, nor to the use of my apparatus solely with newly pressed or stiff mud bricks, nor in any other manner except as specifically recited in the claims hereto annexed, since numberless changes can be made in all such features within the scope of my invention which is limited only by the prior state of the art.

What I claim is:

1. The combination with a conveying belt adapted to convey a plastic clay article, of a plurality of harrowing points past which said belt moves, means for holding said points from moving along said belt while permitting them to move at right angles thereto, and a gauging device movable with said points and limiting their entrance into the clay bar.

2. The combination with a machine adapted to produce a bar of plastic clay of a plurality of pointed devices supported in position to contact the faces of said bar as it moves along, and a roller operatively connected to certain of said devices and engaging a face of said clay bar to limit the insertion of said pointed devices therein.

3. The combination with a machine adapted to produce a bar of plastic clay of a plurality of pointed devices supported in part by said bar in position to contact the faces of said bar as it moves along, and means for moving said points periodically in a plane parallel to the face of the bar which they contact.

4. The combination with a conveying belt for a rectangular article of plastic clay, of a plurality of members located adjacent to said belt and parallel to the respective faces of said article, pointed devices carried by each of said members adapted to engage the surface of said article nearest thereto, and means for moving each of said members as said article moves therepast to form interlaced scratches on said articles.

5. The combination with a conveying belt for a rectangular article of plastic clay, of a supporting member located adjacent to the exposed face of said article, means for supporting said member upon the upper face of said article pointed devices carried by said member adapted to scratch the adjacent face of said article, and means for actuating said member to move said devices cross-wise the direction of travel of said article.

6. The combination, with a brick machine having a conveyor for a clay-bar, of a roller adapted and arranged to run on said bar, a carriage supported by said roller, and pointed devices carried by said carriage arranged and adapted to scratch the clay bar.

7. The combination with a brick machine having a conveyor for a clay-bar, of a carriage, a member carried by said carriage and movable relatively thereto, pointed devices carried by said member and adapted to scratch the clay bar, a roller journaled to said carriage and running against the clay bar to gauge the insertion of said points, and means for moving said member laterally of the path of travel of said clay-bar.

8. The combination with a brick machine having a conveyor for a clay-bar, of a reciprocating rod supported parallel to one face of said clay-bar and transversely of its direction of movement, a plurality of pointed devices carried by said rod arranged and adapted to scratch said clay-bar, and means for reciprocating said rod as the clay bar moves past it.

9. The combination with a brick machine having a conveyor for a clay-bar, of a plurality of reciprocable rods supported parallel to different faces of said clay bar and transversely of its direction of movement, a plurality of pointed devices carried by each rod arranged and adapted to scratch said clay-bar, operative connections between said rods, and means for reciprocating all said rods as said clay-bar is moved past the same.

10. The combination with a brick machine having a conveyor for a clay-bar, of a plurality of reciprocable rods supported parallel to different faces of said clay-bar and transversely of its direction of movement, a plurality of pointed devices carried by each rod and adapted to scratch said clay-bar, a carriage for one of said rods movable toward and from the bar, a roller journaled to said carriage and running against said bar, operative connections between said rods, and means for reciprocating all said rods.

11. The combination with a brick machine having a conveyor for a clay-bar, of a pair of uprights located at opposite sides of such conveyor, a vertically reciprocable rod carried by each upright, a carriage slidably mounted between said uprights, means for gauging the position of said carriage above the conveyor, a horizontally reciprocable rod carried by said carriage, operative connections between said rods, pointed devices carried by said rods for scratching the clay-bar, and means for reciprocating said rods.

In testimony whereof, I hereunto affix my signature.

CHARLES W. HARDWICK.